(12) United States Patent
Lou (10) Patent No.: US 12,504,443 B2
(45) Date of Patent: Dec. 23, 2025

(54) PROBE CARD STRUCTURE INCLUDING PROBE SETS WITH DIFFERENT LENGTHS

(71) Applicant: teCat Technologies (Suzhou) Limited, Suzhou (CN)

(72) Inventor: Choon Leong Lou, Singapore (SG)

(73) Assignee: TECAT TECHNOLOGIES (SUZHOU) LIMITED, Suzhou (CN)

( * ) Notice: Subject to any disclaimer, the term of this patent is extended or adjusted under 35 U.S.C. 154(b) by 136 days.

(21) Appl. No.: 18/519,147

(22) Filed: Nov. 27, 2023

(65) Prior Publication Data

US 2025/0004012 A1 Jan. 2, 2025

(30) Foreign Application Priority Data

Jun. 27, 2023 (CN) .......................... 202310769103.3

(51) Int. Cl.
*G01R 1/073* (2006.01)

(52) U.S. Cl.
CPC ..... *G01R 1/07314* (2013.01); *G01R 1/07357* (2013.01)

(58) Field of Classification Search
None
See application file for complete search history.

(56) References Cited

U.S. PATENT DOCUMENTS

| | | | | |
|---|---|---|---|---|
| 4,622,514 A * | 11/1986 | Lewis | ................ | G01R 1/07357 324/750.25 |
| 5,952,843 A * | 9/1999 | Vinh | ................ | G01R 1/07357 324/754.07 |
| 6,024,579 A * | 2/2000 | Bennett | ................ | H01R 12/714 439/67 |
| 6,530,148 B1 * | 3/2003 | Kister | ................ | G01R 1/07357 451/6 |
| 6,853,208 B2 * | 2/2005 | Okubo | ................ | G01R 3/00 324/756.03 |
| 7,554,348 B2 * | 6/2009 | Brandorff | ................ | G01R 1/07357 324/750.16 |
| 7,816,929 B2 * | 10/2010 | Yamada | ................ | G01R 31/2891 324/754.07 |
| 11,867,723 B2 * | 1/2024 | Felici | ................ | G01R 1/07371 |

(Continued)

FOREIGN PATENT DOCUMENTS

| | | |
|---|---|---|
| CN | 2604693 Y | 5/2004 |
| CN | 216696550 U | 6/2022 |

(Continued)

*Primary Examiner* — Richard Isla
(74) *Attorney, Agent, or Firm* — Li & Cai Intellectual Property (USA) Office (57) ABSTRACT

A probe card structure including probe sets with different lengths is provided. The probe card structure includes an upper guide plate set, a lower guide plate set, a first probe set, a second probe set, and a stiffener. The upper guide plate set includes a first upper guide plate. The lower guide plate set includes a first lower guide plate and a second lower guide plate. The first probe set at least includes a plurality of first probes, and the second probe set includes a plurality of second probes with different lengths from the plurality of first probes. The stiffener holds the upper guide plate set and the upper guide plate set. The first lower guide plate and the second lower guide plate are not disposed on a same horizontal plane.

9 Claims, 4 Drawing Sheets

(56) References Cited

U.S. PATENT DOCUMENTS

| | | | |
|---|---|---|---|
| 2018/0024166 A1 | 1/2018 | Acconcia | |
| 2021/0102974 A1* | 4/2021 | Park | G01R 31/2831 |
| 2022/0155348 A1* | 5/2022 | Crippa | G01R 1/07357 |
| 2025/0334610 A1* | 10/2025 | Felici | G01R 1/07314 |

FOREIGN PATENT DOCUMENTS

| | | |
|---|---|---|
| TW | 201840987 A | 11/2018 |
| TW | 202109050 A | 3/2021 |

* cited by examiner

PROBE CARD STRUCTURE INCLUDING PROBE SETS WITH DIFFERENT LENGTHS

FIELD OF THE DISCLOSURE

The present disclosure relates to a probe card structure, and in particular to a probe card structure including probe sets with different lengths.

BACKGROUND OF THE DISCLOSURE

When semiconductors are under testing, probe cards are used to contact pads, bumps or solder balls on the device under test (DUT), the electrical signals are analyzed to obtain the test results of the device under test. A chip let is packaged by splitting all the components on the original chip into small units and then undergoes strengthening, design, and remanufacturing processes to form a system chip.

Figure 1:
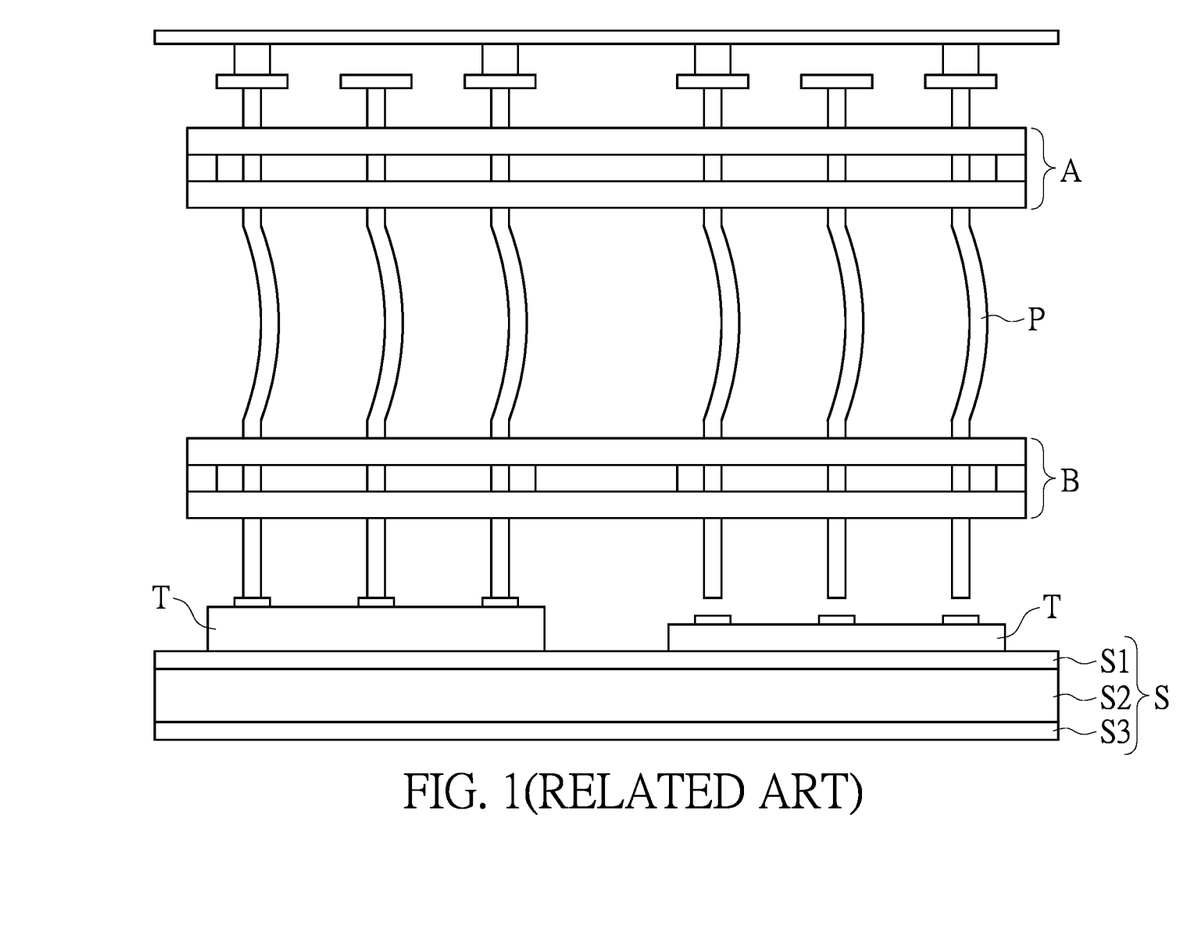
FIG. 1 is a schematic diagram showing problems of the prior art.

However, as shown in FIG. 1, a plurality of devices under test T with different sizes are disposed on the silicon intermediate layer S1 (e.g., wafer). In the conventional technology, when using a probe card provided with a plurality of probes P passing through the upper guide plate A and the lower guide plate B with a same size to test the plurality of devices under test T, if heights of the plurality of devices under test T are different, the balance contact force (BCF) of each of the probes P will be different when the tip of each of the probes P touches the devices under test T, moreover, the probes P may even be unable to contact a part of the devices under test T and cannot evenly contact the pads, bumps or solder balls on the devices under test T, thereby affecting the test accuracy.

Therefore, how to improve the testing capability of the probe card through the improvement of structural design to overcome the above-mentioned defects has become an important issue to be solved in this field.

SUMMARY OF THE DISCLOSURE

To solve the above problem, the present disclosure provides a probe card structure including probe sets with different lengths, which includes an upper guide plate set, a lower guide plate set, a first probe set, a second probe set and a stiffener. The upper guide plate set at least includes a first upper guide plate, and the first upper guide plate has a plurality of upper guide plate holes. The lower guide plate set at least includes a first lower guide plate and a second lower guide plate, the first lower guide plate has at least one first lower guide plate hole, and the second lower guide plate has at least one second lower guide plate hole. The first probe set includes a plurality of first probes, each of the plurality of first probes has a first contact end and a second contact end, the first contact end correspondingly passes through the upper guide plate hole, and the second contact end correspondingly passes through the at least one first lower guide plate hole. The second probe set includes a plurality of second probes, each of the plurality of second probes has a third contact end and a fourth contact end, and the third contact end correspondingly passes through the upper guide plate hole, the fourth contact end correspondingly passes through the at least one second lower guide plate hole, and the length of each of the plurality of second probes is greater than the length of each of the plurality of first probes. The stiffener holds the upper guide plate set and the lower guide plate set. The first lower guide plate and the second lower guide plate are not disposed on a same horizontal plane.

In certain embodiments, the lower guide plate set further includes a third lower guide plate, and the third lower guide plate includes at least one third lower guide plate hole, the probe card structure further includes a third probe set including a plurality of third probes, each of the plurality of third probes has a fifth contact end and a sixth contact end, the fifth contact end correspondingly passes through the upper guide plate hole, and the sixth contact end correspondingly passes through the at least one third lower guide plate hole, the length of each of the plurality of third probes is greater than the length of each of the plurality of second probes, and the first lower guide plate, the second lower guide plate and the third lower guide plate are not disposed on a same horizontal plane.

One of the beneficial effects of the present disclosure is that, in the probe card structure including probe sets with different lengths provided by the present disclosure, by virtue of "the probe card structure including probe sets with different lengths includes an upper guide plate set, a lower guide plate set, a first probe set, a second probe set and a stiffener", "the stiffener holds the upper guide plate set, the first lower guide plate and the second lower guide plate" and "the first lower guide plate and the second lower guide plate are not disposed on a same horizontal plane" evenly contact between the probes and the corresponding pads, bumps or solder balls on the device under test can be achieved, and the test capability of the probe card to test devices under test with different heights of test points can be improved.

These and other aspects of the present disclosure will become apparent from the following description of the embodiment taken in conjunction with the following drawings and their captions, although variations and modifications therein can be affected without departing from the spirit and scope of the novel concepts of the disclosure.

BRIEF DESCRIPTION OF THE DRAWINGS

The described embodiments can be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
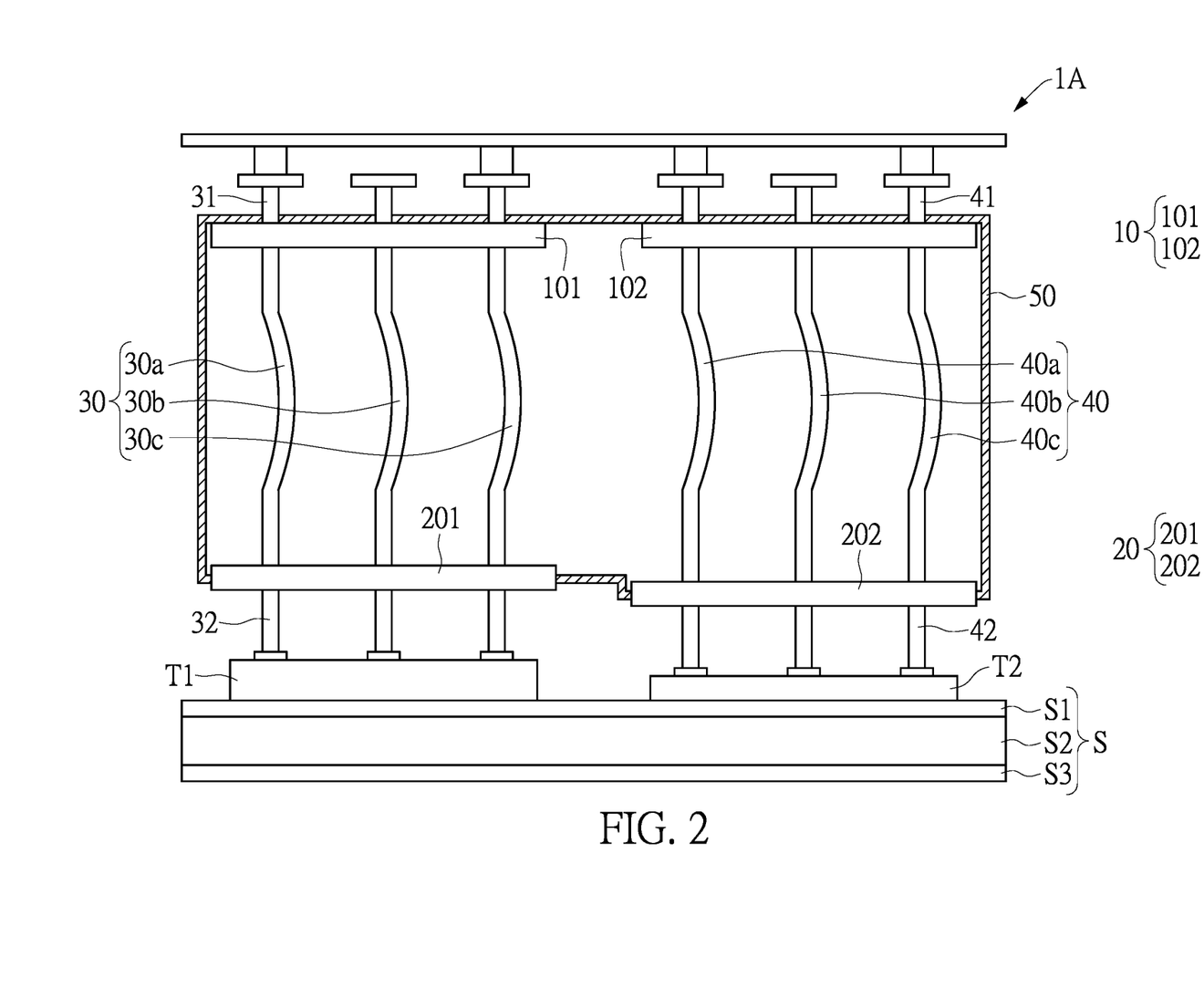
FIG. 2 is a schematic side view of a first embodiment of the present disclosure.

Referring to FIG. 2, the first device under test T1 and the second device under test T2 have different heights. In order to test the electrical properties of the first device under test T1 and the second device under test T2, the first embodiment of the present invention provides a probe card structure 1A, which includes an upper guide plate set 10, a lower guide plate set 20, a first probe set 30, a second probe set 40, and a stiffener 50. The upper guide plate set 10 at least includes a first upper guide plate 101. In one embodiment, the upper guide plate set 10 can include a first upper guide plate 101 and a second upper guide plate 102, and the first upper guide plate 101 and the second upper guide plate 102 respectively includes a plurality of upper guide plate holes. The lower guide plate set 20 at least includes a first lower guide plate 201 and a second lower guide plate 202, and the first lower guide plate 201 and the second lower guide plate 202 respectively includes a plurality of lower guide plate holes. The first probe set 30 includes a plurality of first probes 30a, 30b, 30c, each of the plurality of first probes 30a, 30b, 30c includes a first contact end 31 and a second contact end 32. The first contact end 31 and the second contact end 32 are two opposite ends of each of the plurality of first probes 30a, 30b, 30c. The first contact end 31 correspondingly passes through the hole of the upper guide plate, and the second contact end 32 correspondingly passes through the hole of the first lower guide plate. The second probe set 40 includes a plurality of second probes 40a, 40b, 40c, and each of the plurality of second probes 40a, 40b, 40c includes a third contact end 41 and a fourth contact end 42, the third contact end 41 and the second contact end. The third contact end 41 and the fourth contact end 42 are two opposite ends of each of the plurality of second probes 40a, 40b, 40c. The third contact end 41 correspondingly passes through the hole of the upper guide plate, and the fourth contact end 42 correspondingly passes through the hole of the second lower guide plate.

For example, each of the plurality of first probes 30a, 30b, 30c and each of the plurality of second probes 40a, 40b, 40c of the present disclosure can be vertical spring-loaded pin (Pogo Pin). However, the present disclosure does not limit the type of the first probes 30a, 30b, 30c and the second probes 40a, 40b, 40c, as long as they can be installed on a probe card to test the first device under test T1 and the second device under test T2.

In one embodiment of the present disclosure, the first probes 30a, 30b, 30c and the second probes 40a, 40b, 40c can be made of metals with good conductivity and good elasticity, such as copper, palladium, silver, gold, platinum, tungsten, rhenium tungsten, beryllium copper, palladium gold, palladium silver, tungsten carbide or alloys of the above materials, etc. Preferably, on each of the plurality of first probes 30a, 30b, 30c and each of the plurality of second probes 40a, 40b, 40c further includes an insulating coating.

In one embodiment of the present disclosure, the upper guide plate group 10 can include a first upper guide plate 101 and a second upper guide plate 102 disposed on a same horizontal plane, the first upper guide plate 101 and the second upper guide plate 102 respectively includes a plurality of upper guide plate holes (not shown). The lower guide plate set 20 can include a first lower guide plate 201 and a second lower guide plate 202 being parallel to the upper guide plate set 10. The first lower guide plate 201 has at least one first lower guide plate hole, and the second lower guide plate 202 has a at least one second lower guide plate hole. The first contact end 31 of the each of the plurality of first probes 30a, 30b, 30c correspondingly protrudes from the upper guide plate set 10 from the upper guide plate hole, and is connected to the conductive contact of the space transformer or the main circuit board. The second contact end 32 correspondingly protrudes out of the first lower guide plate 201 from the at least one first lower guide plate hole, so as to contact the first device under test T1. The third contact end 41 of the second probe 40a, 40b, 40c correspondingly protrudes from the upper guide plate set 10 from the upper guide plate hole, and is connected to the conductive contact of the space transformer or the main circuit board. The fourth contact end 42 correspondingly protrudes out of the second lower guide plate 202 from the at least one second lower guide plate hole, so as to contact the second device under test T2.

That is, the first contact end 31 of each of the plurality of first probes 30a, 30b, 30c exposes above the upper guide plate set 10 after correspondingly passing through the upper guide plate holes of the upper guide plate set 10. The second contact end 32 of each of the plurality of first probes 30a, 30b, 30c exposes below the first lower guide plate 201 after correspondingly passing through the at least one first lower guide plate hole of the first lower guide plate 201. The third contact end 41 of each of the plurality of second probes 40a, 40b, 40c exposes above the upper guide plate set 10 after correspondingly passing through the upper guide plate holes of the upper guide plate set 10. The fourth contact end 42 of each of the plurality of second probes 40a, 40b, 40c exposes below the second lower guide plate 201 after correspondingly passing through the at least one second lower guide plate hole of the second lower guide plate 202.

In this way, the first contact end 31 of the each of the plurality of first probes 30a, 30b, 30c is electrically connected to the adapter board. The second contact end 32 contact the first device under test T1. The third contact end 41 of each of the plurality of second probes 40a, 40b, 40c is electrically connected to the adapter board, and the fourth contact end 42 contact the second device under test T2. Furthermore, the second contact end 32 and the fourth contact end 42 respectively have a tip for contacting the metal pads, bumps or solder balls of the first device under test T1 and the second device under test T2.

In another aspect, each of the plurality of first probes 30a, 30b, 30c and each of the plurality of second probes 40a, 40b, 40c can be vertical probe, and the type of the probes 30 are not limited thereto in the present disclosure. In one embodiment of the present disclosure, each of the plurality of first probes 30a, 30b, 30c and each of the plurality of second probes 40a, 40b, 40c can be an elastic structure, which can produce bending deformation after bearing an axial external force and exceeding a critical load, so that the first probes 30a, 30b, 30c and the second probes 40a, 40b, 40c are not easily broken due to external compression. In one embodiment of the present disclosure, the distance between the plurality of first probes 30a, 30b, 30c and the plurality of second probes 40a, 40b, 40c is 50 microns (μm) or less, preferably 40 microns (μm) or less, for creating probe cards suitable for testing small wafers.

In the embodiment, a quantity of the first lower guide plate 201 and a quantity of the second lower guide plate 202 are the same. However, the first lower guide plate 201 and the second lower guide plate 202 have different levels relative to the substrate S, so as to support the first probes 30a, 30b, 30c and the second probes 40a, 40b, 40c with different lengths. The first device under test T1 and the second device under test T2 are disposed on the substrate S, and the substrate S can be sequentially composed of a silicon interposer S1, a packaging substrate S2 and a circuit board S3. The circuit board S3 can be a printed circuit board (PCB) or a flexible printed circuit board (FPCB).

Furthermore, the present disclosure adopts an integrally formed stiffener 50 to hold the upper guide plate set 10 and the lower guide plate set 20. In the embodiment, the lower guide plate set 20 includes a first lower guide plate 201 and a second lower guide plate 202. When viewed from the side, the stiffener 50 is a polygonal instead of a quadrilateral, so that the upper guide plate set 10, the first lower guide plate 201 and the second lower guide plate 202 are fixed in place by the stiffener 50. Specifically, the stiffener 50 can have a stepped structure. Therefore, when a plurality of probes are disposed on the same upper guide plate set 10, it is unnecessary to additionally increase the quantity of the first lower guide plate 201 and the second lower guide plate 202 to adjust the distance between the first probes 30a, 30b, 30c and the first device under test T1 or the distance between the second probe 40a, 40b, 40c and the second device under test T2. In other words, a distance between the second lower guide plate 202 and the upper guide plate set 10 can be greater than a distance between the first lower guide plate 201 and the upper guide plate set 10 through the stiffener 50 of the present disclosure.

In detail, the first upper guide plate group 10 can include a first upper guide plate 101 and a second upper guide plate 102, the second upper guide plate 102 has a plurality of upper guide plate holes. The first upper guide plate 101 and the second upper guide plate 102 are disposed on a same horizontal plane. The first lower guide plate 201 is configured to correspond to the first upper guide plate 101, the first contact end 31 of the first probe set 30 correspondingly passes through the upper guide plate holes of the first upper guide plate 101, the second contact end 32 correspondingly passes through the at least one first lower guide plate hole of the first lower guide plate 201, and the third contact end 41 of the second probe set 40 correspondingly passes through the upper guide plate holes of the second upper guide plate 102, the fourth contact end 42 correspondingly passes through the at least one second lower guide plate hole of the second lower guide plate 202. The distance between the second lower guide plate 202 and the second upper guide plate 102 is greater than the distance between the first lower guide plate 201 and the first upper guide plate 101.

According to an embodiment of the present disclosure, when the first device under test T1 and the second device under test T2 with different heights are disposed on the same substrate S, for the second device under test T2 with a lower height, the second lower guide plate 202 can be closer to the second device under test T2 through the structural design of the stiffener 50. In this way, the distance between the first lower guide plate 201 and the first device under test T1 is substantially the same as the distance between the second lower guide plate 202 and the second device under test T2. The first device under test T1 and the second device under test T2 on the substrate S with different heights can be simultaneously tested by the probe card structure 1A of the present disclosure.

Second Embodiment

Figure 3:
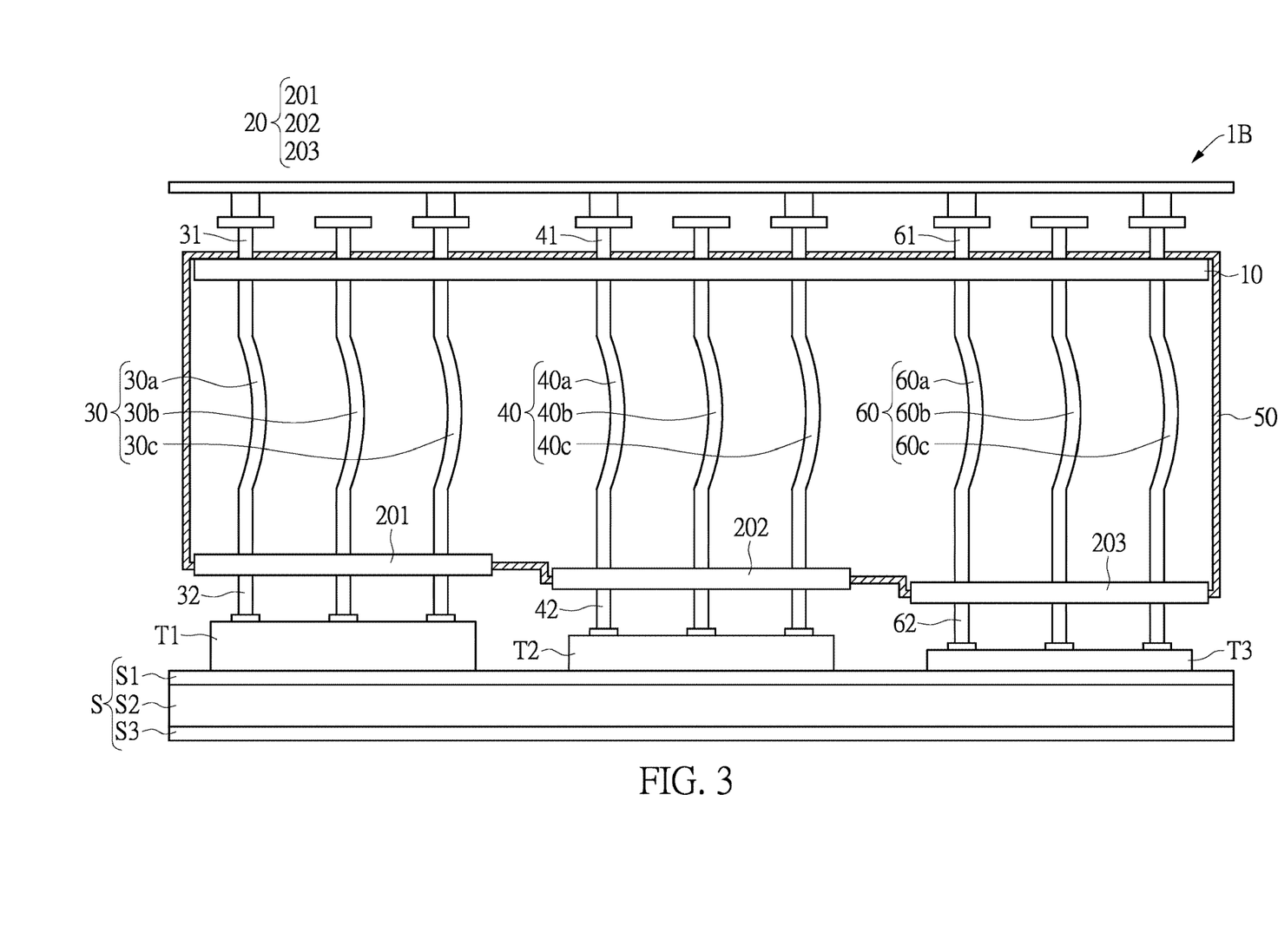
FIG. 3 is a schematic side view of a second embodiment of the present disclosure.

Referring to FIG. 3, FIG. 3 shows a second embodiment of the present disclosure. The second embodiment is substantially the same as the first embodiment, and the differences are described as follows. The probe card structure 1B of the second embodiment of the present disclosure further includes a third probe set 60, and the third probe set 60 includes a plurality of third probes 60a, 60b, 60c. The lower guide plate set 20 further includes a third lower guide plate 203. In the embodiment, the probe card structure 1B is used to test three devices under test (first devices under test T1, second devices under test T2 and third devices under test T3) with different heights. The third lower guide plate 203 is not disposed on a same horizontal plane as the first lower guide plate 201 and the second lower guide plate 202. Specifically, a height of the first device under test T1 is higher than a height of the second device under test T2, and a height of the second device under test T2 is higher than a height of the third device under test T3.

For example, the first device under test T1, the second device under test T2 and the third device under test T3 can be a central processing unit (Central Processing Unit, CPU), a digital signal processor (Digital Signal Processor, DSP), a power management chip (Power Management IC, PMIC) or dynamic random access memory (Dynamic Random Access Memory, DRAM), etc. However, the above-mentioned example is only one possible embodiment and is not intended to limit the present disclosure.

In the probe card structure 1B of the second embodiment of the present invention, each third probe 60a, 60b, 60c has a fifth contact end 61 and a sixth contact end 62, the fifth contact end 61 and the sixth contact end 62 are two opposite ends of each third probe 60a, 60b, 60c. The third lower guide plate 203 has at least one third lower guide plate hole, the fifth contact end 61 correspondingly passes through the upper guide plate holes, and the sixth contact end 62 correspondingly passes through the third lower guide hole.

In the embodiment, through the stiffener 50, a level of the first lower guide plate 201 is set higher than a level of the second lower guide plate 202 and a third lower guide plate 203, and the level of the second lower guide plate 202 is set higher than the level of the third lower guide plate 203. That is, the distance between the third lower guide plate 203 and the upper guide plate set 10 is set to be greater than the distance between the second lower guide plate 202 and the upper guide plate set 10. At this time, a bottom surface of the stiffener 50 has a stepped structure, thereby the distance between the first lower guide plate 201 and the first device under test T1 is substantially equal to the distance between the second lower guide plate 202 and the second device under test T2 and the distance between the third lower guide plate 203 and the third device under test T3.

Under the circumstances, the first lower guide plate 201, the second lower guide plate 202 and the third lower guide plate 203 respectively correspond to the upper guide plate set 10. The disposition of the first lower guide plate 201, the second lower guide plate 202 and the third lower guide plate 203 are respectively corresponding to the first device under test T1, the second device under test T2 and the third device under test T3. Since the distances between each probes of the probe card structure 1B and each device under test are approximately the same when the probe card structure 1B of the present disclosure simultaneously tests the first device under test T1, the second device under test T2 and the third device under test T3, each probes of the probe card structure 1B can evenly contact each device under test, resulting in improved test capability of the probe card structure 1B.

It should be noted that the first lower guide plate 201, the second lower guide plate 202, and the third lower guide plate 203 in the drawings are only for simple illustration. As long as the quantity of the first lower guide plate 201, the quantity of the second lower guide plate 202 and the quantity of the third lower guide plate 203 are the same, the quantity of the first lower guide plate 201, the quantity of the second lower guide plate 202 and the quantity of the third lower guide plate 203 of the present disclosure are not limited to one. In one embodiment of the present disclosure, the level of the first lower guide plate 201, the level of the second lower guide plate 202 and the level of the third lower guide plate 203 are different from each other, that is, the first lower guide plate 201, the second lower guide plate 202 and the third lower guide plate 203 are not disposed on a same horizontal plane.

Third Embodiment

Figure 4:
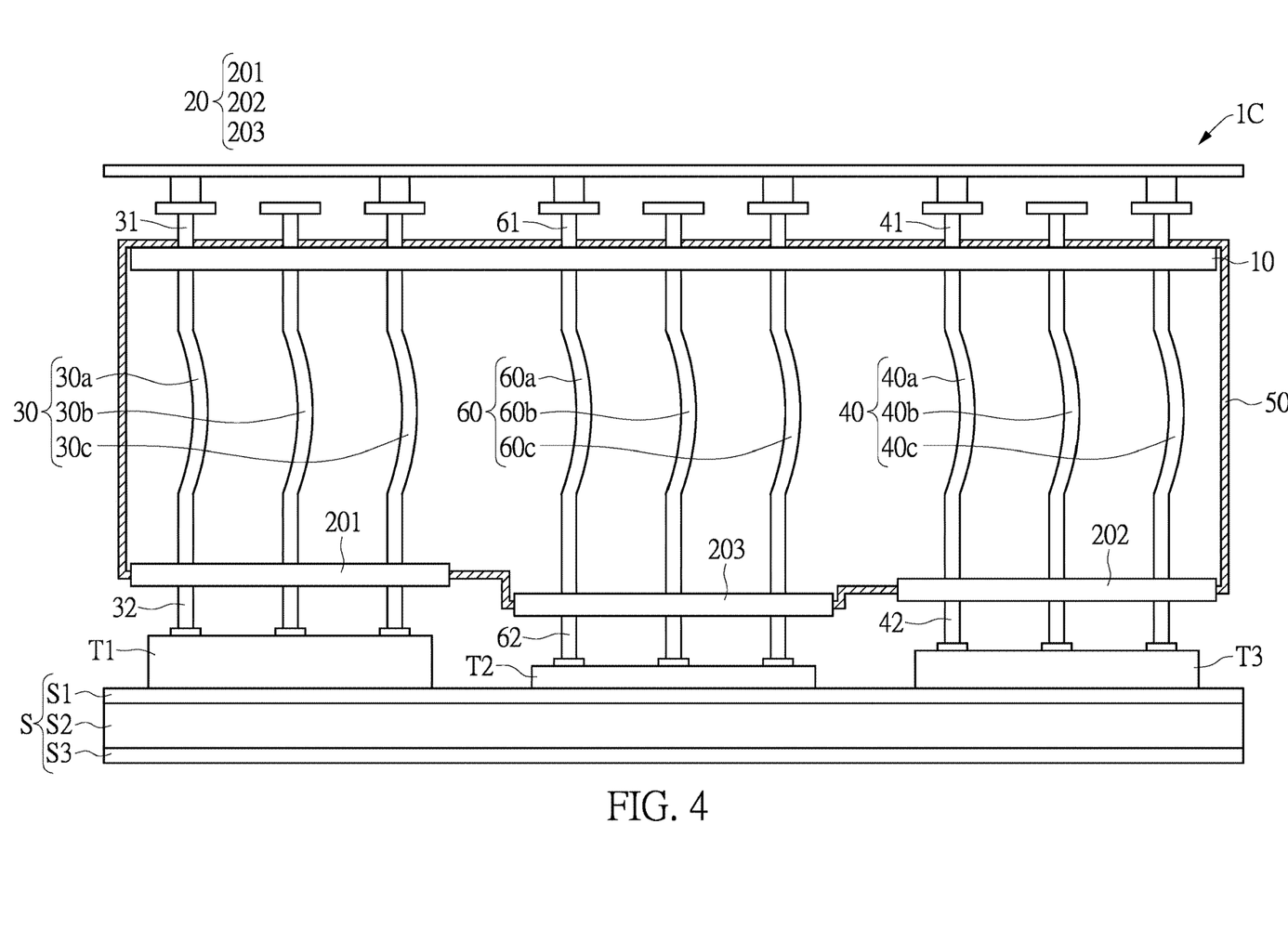
FIG. 4 is a schematic side view of a third embodiment of the present disclosure.

Referring to FIG. 4, FIG. 4 shows a third embodiment of the present disclosure. The third embodiment is substantially the same as the second embodiment, and the differences are described as follows. The probe card structure 1C of the second embodiment of the present disclosure further includes a third lower guide plate 203. In one embodiment, when viewed from the side, a length of the first lower guide plate 201, a length of the second lower guide plate 202 and a length of the third lower guide plate 203 are the same length. In this embodiment, the probe card structure 1C is used to test three devices under test (first devices under test T1, second devices under test T2 and third devices under test T3) with different heights. Specifically, a level of the first device under test T1 is set higher than a level of the second device under test T2, and a level of the third device under test T3 is set lower than the level of the first device T1 but is set higher than the level of the second device T2.

In this embodiment, through the stiffener 50, the first lower guide plate 201 is configured to correspond to the first device under test T1, and the second lower guide plate 202 is configured to correspond to the third device under test T3, the third lower guide plate 203 is configured to correspond to the second device under test T2. At this time, a bottom surface of the stiffener 50 is concave-convex shaped, so that the distance between the first lower guide plate 201 and the first device under test T1 is approximately equal to the distance between the second lower guide plate 202 and the third device under test T3 and the distance between the third lower guide plate 203 and the second device under test T2.

Under the circumstances, even when the second device under test T2 with a lower height is located between the first device under test T1 and the third device under test T3 with relatively higher heights on the substrate S, the probe card structure 1C provided by the present disclosure can also be used to simultaneously test the first device under test T1, the second device under test T2 and the third device under test T3. At this time, since the distance between each of the probes and each device under test is approximately the same, each of the probes of the probe card structure 1C can evenly contact each device under test, resulting in improved test capability of the probe card structure 1C.

In addition, under the circumstance of each of the probes with different lengths and of the same thickness, this will result in different elasticity, which in turn will affect the stability of the test. In one embodiment of the present disclosure, a plurality of probes with different cross-sectional areas can be used. For example, with the combination of long probes with larger cross-sectional areas and short probes with smaller cross-sectional areas, the contact force of the probes can be balanced when the probes contact surfaces of the plurality devices under tests with different heights. Accordingly, the design of the present disclosure not only makes the lengths of the probes between the lower guide plate and the device under test the same through the reinforcing member 50, but also makes the balance contact force (BCF) of each of the probes consistent or very close through the thickness difference and cross-sectional area difference between each of the probes.

For example, the first probe set 30, the second probe set 40 and the third probe set 60 can be vertical probes. A tip thickness of the second probe set 40 or a tip thickness of the third probe set 60 is different from a tip thickness of the first probe set 30. In one embodiment, the tip thickness of the second probe set 40 is different from the tip thickness of the third probe set 60.

BENEFICIAL EFFECTS OF THE EMBODIMENTS

One of the beneficial effects of the present disclosure is that, in probe card structure including probe sets with different lengths provided by the present disclosure by virtue of "the probe card structure including probe sets with different lengths includes: an upper guide plate set, a lower guide plate set, a first probe set, a second probe set and a stiffener", "the first probe set including a plurality of first probes, each of the plurality of first probes having a first contact end and a second contact end, the first contact end correspondingly passing through the upper guide plate hole, and the second contact end correspondingly passing through the at least one first lower guide plate hole", "the second probe set including a plurality of second probes, each of the plurality of second probes having a third contact end and a fourth contact end, and the third contact end correspondingly passing through the upper guide plate hole, the fourth contact end correspondingly passing through the at least one second lower guide plate hole, wherein the length of each of the plurality of second probes is greater than the length of each of the plurality of first probes", "the stiffener holds the upper guide plate set, the first lower guide plate and the second lower guide plate" and "the first lower guide plate and the second lower guide plate are not disposed on a same horizontal plane", the probes can evenly contact the corresponding pads, bumps or solder balls on the device under test, resulting in improved test capability of the probe card.

Furthermore, the probe card structure of the present disclosure holds the upper guide plate set and the lower guide plate set in place through the stiffener 50, so that when the probes contact the device under test and the circuit substrate, the upper guide plate set and the lower guide plate set will not generate misalignment. In this way, the stability of the electrical conduction will be improved.

The probes with different sizes of probe card structure of the present disclosure can be used according to different devices under test. Further, when the probe used is longer, select the probe size with a larger cross-sectional area; when the probe used is shorter, select the probe size with a smaller cross-sectional area. By virtue of the needle type difference of the probe, the elasticity of the probe can be adjusted. In this way, when the probe card structure of the present disclosure is used to simultaneously test the substrates of devices under test with different heights, the tips of the probes have a very close balance contact force (balance contact force, BCF), resulting in improved test stability of the probe card.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A probe card structure including probe sets with different lengths, comprising:
    an upper guide plate set at least including a first upper guide plate, wherein the first upper guide plate has a plurality of upper guide plate holes;
    a lower guide plate set, the lower guide plate set at least including a first lower guide plate and a second lower guide plate, the first lower guide plate having a plurality of first lower guide plate holes, and the second lower guide plate having a plurality of second lower guide plate holes;
    a first probe set, the first probe set including a plurality of first probes, each of the plurality of first probes having a first contact end and a second contact end, the first contact end correspondingly passing through one of the plurality of upper guide plate holes, and the second contact end correspondingly passing through one of the plurality of first lower guide plate holes, wherein the plurality of first probes does not pass through the second lower guide plate;
    a second probe set, the second probe set including a plurality of second probes, each of the plurality of second probes having a third contact end and a fourth contact end, and the third contact end correspondingly passing through the upper guide plate hole, the fourth contact end correspondingly passing through one of the plurality of second lower guide plate holes, wherein a length of each of the plurality of second probes is greater than a length of each of the plurality of first probes, wherein the plurality of second probes does not pass through the first lower guide plate; and
    a stiffener, the stiffener correspondingly holding the upper guide plate set and the lower guide plate set, wherein the stiffener is a single molded piece;
    wherein the first lower guide plate and the second lower guide plate are not disposed on a same horizontal plane;
    wherein a distance between the first lower guide plate and a first device under test is approximately equal to a distance between the second lower guide plate and a second device under test.

2. The probe card structure according to claim 1, wherein, when viewed from a side of the probe card structure, the stiffener has a stepped structure.

3. The probe card structure according to claim 1, wherein a distance between the second lower guide plate and the upper guide plate set is greater than a distance between the first lower guide plate and the upper guide plate set.

4. The probe card structure according to claim 3, wherein the upper guide plate set further includes a second upper guide plate, the second upper guide plate includes a plurality of upper guide plate holes, the first upper guide plate and the second upper guide plate are disposed on another same horizontal plane, the first lower guide plate and the first upper guide plate correspond to each other, the first contact end of the first probe set correspondingly passes through the upper guide plate hole of the first upper guide plate, and the second contact end correspondingly passes through the at least one first lower guide plate hole, the third contact end of the second probe set correspondingly passes through the upper guide plate hole of the second upper guide plate, and the fourth contact end correspondingly passes through the at least one second lower guide plate hole;
    wherein a distance between the second lower guide plate and the second upper guide plate is greater than a distance between the first lower guide plate and the first upper guide plate.

5. The probe card structure according to claim 1, wherein the lower guide plate set further includes a third lower guide plate, and the third lower guide plate includes at least one third lower guide plate hole,
    wherein the probe card structure further includes a third probe set including a plurality of third probes, each of the plurality of third probes has a fifth contact end and a sixth contact end, the fifth contact end correspondingly passes through the upper guide plate hole, and the sixth contact end correspondingly passes through the at least one third lower guide plate hole, a length of each of the plurality of third probes is greater than the length of each of the plurality of second probes, and the first lower guide plate, the second lower guide plate and the third lower guide plate are not disposed on a same horizontal plane.

6. The probe card structure according to claim 5, wherein a distance between the second lower guide plate and the upper guide plate set is greater than a distance between the first lower guide plate and the upper guide plate set, and a distance between the third lower guide plate and the upper guide plate set is greater than the distance between the second lower guide plate and the upper guide plate set.

7. The probe card structure according to claim 5, wherein, when viewed from a side of the probe card structure, a length of the first lower guide plate, a length of the second lower guide plate, and a length of the third lower guide plate are the same.

8. The probe card structure according to claim 5, wherein the first probe set, the second probe set and the third probe set are vertical probes, and a tip thickness of the second probe set or a tip thickness of the third probe set is different from a tip thickness of the first probe set.

9. The probe card structure according to claim 8, wherein the tip thickness of the second probe set is different from the tip thickness of the third probe set.

* * * * *